United States Patent Office 3,301,834
Patented Jan. 31, 1967

3,301,834
POLYMERIZATION OF OLEFINS
Donald L. Christman, Wilmington, Del., assignor to Hercules Incorporated, a corporation of Delaware
No Drawing. Filed Sept. 11, 1963, Ser. No. 308,065
9 Claims. (Cl. 260—80.5)

The present invention relates to a process for the polymerization of ethylene, and, more particularly, it relates to a process for the homopolymerization of ethylene and for the copolymerization of ethylene with other ethylenically unsaturated hydrocarbons.

It is known to homopolymerize ethylene and to copolymerize ethylene with other ethylenically unsaturated hydrocarbons in an inert organic diluent in the presence of a catalyst prepared by reacting a tri- to pentavalent vanadium compound soluble in the organic diluent with an organoaluminum compound. The homopolymers obtained by such processes are predominantly crystalline polymers while the copolymers that contain a substantial amount of a second monomer are predominantly amorphous.

It has been experienced that the aforesaid vanadium-containing catalysts have a relatively short catalytic life and relatively low efficiency.

It has now been found that homopolymers of ethylene and copolymers of ethylene with other ethylenically unsaturated hydrocarbons can be prepared advantageously by polymerization in an inert organic diluent using catalysts which are obtained by reaction of a tri- to pentavalent vanadium compound soluble in the diluent with an organoaluminum compound in the presence of a halogenated aliphatic compound of the formula $C(X)_3Y$, where X is halogen, at least 2 of which are selected from the group consisting of chlorine and bromine, and Y is a radical selected from the group consisting of

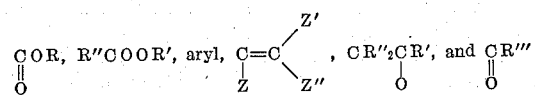

wherein R and R' represent hydrogen, alkyl, haloalkyl, aryl, haloaryl, or alkaryl; R" represents alkylene; R'" represents alkyl, haloalkyl, aryl, haloaryl, or alkaryl; Z represents hydrogen, halogen, alkyl, haloalkyl, aryl, or haloaryl; and Z' and Z" represent halogen, alkyl, haloalkyl, aryl, or haloaryl.

For purposes of convenience, the aforesaid halogen-containing aliphatic compound will be hereinafter referred to as a "halogen-containing promoter."

The halogen-containing promoters useful in the invention include, by way of example, ethyl trichloroacetate, t-butyl trichloroacetate, hexachloroacetone, hexachloropropylene, benzotrichloride, methyl tribromoacetate, tribromoacetic acid, trichloroacetic acid, and similar compounds.

The presence of the halogen-containing promoter, which is the novel feature of the invention, is responsible for several important advantages. The outstanding advantage is that the activity of the catalyst is so greatly increased that it is possible to use less vanadium compound to obtain a given rate of reaction and, hence, less vanadium compound per unit weight of polymer.

In addition to the homopolymerization of ethylene, the invention can be used to copolymerize ethylene with 1 or more α-olefins such as propylene, butene-1, pentene-1, hexene-1, 4-methylpentene-1, 5,5-dimethylhexene-1, styrene, α-methylstyrene, allylbenzene, hexadiene-1,5, heptadiene-1,5- 11-ethyltridecyldiene-1,10, dicyclopentadiene, cyclooctadiene, and the like. The copolymers of particular value which can be prepared according to the invention are copolymers of ethylene and propylene, and copolymers of ethylene, propylene, and one of the diolefins mentioned above such as dicyclopentadiene.

Aside from the presence of the halogen-containing promoter, the process of the invention is carried out by established techniques. Thus, the diluents which can be used in the process are also well known and include such compounds as heptane, benzene, toluene, chlorobenzene, cyclohexane, carbon tetrachloride, tetrachloroethylene, trifluoroethane, and the like.

Suitable vanadium catalyst components useful in the invention are vanadium halides such as $VOCl_3$ or $VCl_4$, and also addition complexes of these vanadium halides with oxygen- or nitrogen-containing ligands, i.e., compounds like $VOCl_3$—tetrahydrofuran or vanadium tetrachloride-bispyridine can be used. It is also possible to use chelate complexes of vanadium with 1,3-dioxo compounds of the general formula

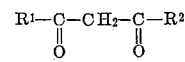

(where $R^1$ and $R^2$ are unsubstituted and/or substituted alkyl residues with 1–4 C-atoms, or phenyl), e.g., with compounds such as acetylacetone, benzoylacetone, or acetoacetic ester. These chelate complexes can be derived from 3-, 4-, or 5-valent vanadium, and in the complex not only the 1,3-dioxo component alone can be bound to the vanadium, but also halogen and/or oxygen atoms. Examples thereof are: diacetylacetone vanadium-IV-oxide, acetoacetic ester-vanadium - V - oxydichloride, and tribenzoylacetone vanadium-III. Finally, suitable catalyst components are also vanadium halides soluble in organic solvents, in which the halogen atoms, in particular of $VCl_4$ or of $VOCl_3$, are substituted completely or partially by alkoxy- or aroxy groups such as, e.g., the butyl ester of o-vanadic acid or ethoxyvanadium-V-oxydichloride.

Organoaluminum compounds which can be used are: aluminum trialkyls, alkylaluminum dihalides, dialkylaluminum halides, and mixtures of these alkylaluminum halides, in which the alkyl groups can comprise 1–8 carbon atoms and halide includes fluorides, chlorides, and bromides. It is also possible to use triphenylaluminum.

The homopolymerization of ethylene according to the invention can be carried out either in solution or in suspension, depending upon the temperature employed, while copolymerization is usually carried out in solution since the copolymers in most instances are soluble in the reaction diluent. The process can be carried out as a batch process or as a continuous process and at normal atmospheric pressure or under elevated or reduced pressures. Normally, pressures of 1–10 atmospheres are preferred. The polymerization temperature can vary considerably but will normally range from room temperature to about 150° C.

In carrying out the polymerization, the vanadium compound, organoaluminum compound, and the halogen-containing promoter, each in the form of a solution in the polymerization diluent, can be added separately to the polymerization reaction as the reaction proceeds. Alternatively, one of the catalyst components or the halogen-containing promoter, or both, can be added at the outset of the polymerization together with one or more of the monomers to be polymerized, while the remaining catalyst component is added during the course of the reaction. Another procedure comprises mixing the organoaluminum compound and halogen-containing promoter in the polymerization diluent and adding this mixture to the polymerizer simultaneously with a solution of the vanadium compound. It is also possible to start the polymerization in the presence of the vanadium compound and the organoaluminum compound and to increase the catalyst activity at a later time by the addition of the halogen-containing promoter.

The polymer that is formed can be separated from the diluent by known procedures. For instance, the polymer solution or slurry, as the case may be, can be extracted with water and the diluent removed by steam distillation. In the case of polymer solutions, the polymer can be precipitated by the addition of acetone or a similar non-solvent.

The invention will now be illustrated by the following examples in which parts and percentages are by weight unless otherwise specified.

In the process of the invention, the molar ratio of halogen-containing promoter to vanadium compound is desirably from 10:1 to 100:1. However, even a larger ratio of the halogen-containing promoter, for example, up to 1000:1, can be employed. The molar ratio of vanadium compound to aluminum compound should be generally 1:3 to 1:30, although higher ratios up to 1:3000 are operable. The amount of the catalyst components is generally very small, and usually lies from 0.001 to 1 mMole vanadium per liter of diluent.

*Examples 1–6*

The general procedure used in these examples was as follows:

Two liters of n-heptane dried over molecular sieves was admitted to a 1-gallon Sutherland reactor. After the addition of solvent, the reactor was evacuated using a water aspirator, and propylene (also dried by passage through a column of molecular sieves) was passed into the reactor with stirring until the gas pressure was at least 760 mm. The mixture was heated to 50° C. with stirring and the addition of propylene continued until the pressure reached 17 p.s.i.g. Ethylene, also dried over molecular sieves, was admitted until the pressure reached 30 p.s.i.g. Analysis of the gas showed that it contained propylene and ethylene in the molar ratio of 70:30. Aluminum sesquichloride (an equimolar mixture of diethylaluminum chloride and ethylaluminum dichloride) in the amount of 1 mM. was added along with 1.65 ml. (1.61 g.) of dicyclopentadiene. Three streams of liquid were then added simultaneously. The first contained 0.15 M aluminum sesquichloride; the second, 1.72 M dicyclopentadiene and .0935 M halogen-containing promoter; and the third, 0.05 M vanadium oxytrichloride, all in solution in n-heptane. The rate of addition of the first and second streams was kept constant at 0.43 ml. per minute. The rate of addition of the vanadium was varied as required to maintain a polymerization rate of 1 liter of gas per minute as measured at 1 atmosphere and 25° C. The gas admitted during the polymerization contained 70% ethylene and 30% propylene and the pressure was kept constant at 30 p.s.i.g. by the adjustment of the vanadate addition rate.

By this method, the polymerization was continued until a viscous solution of terpolymer had formed. This was blown into a receiver containing several ml. of isopropanol and 10 ml. of a 2% solution of 2,2-methylene-bis(4-methyl-6-t-butyl)sulfide in n-heptane to prevent oxidation. The solution was washed with distilled water until neutral. The rubbery terpolymer was recovered by tray-drying to remove the solvent.

The following table identifies the halogen-containing promoters used in each example together with the rate at which it was necessary to add the vanadium catalyst component in order to maintain the prescribed rate of polymerization.

TABLE

| Example No. | Promoter | VOCl₃ Addition (mM. V/min.) |
|---|---|---|
| Control | None | 0.023 |
| 1 | CCl₃COOC₂H₅ | 0.0042 |
| 2 | CCl₃COOH | 0.0165 |
| 3¹ | CCl₃CCl=CCl₂ | 0.0039 |
| 4 | CBr₃COOCH₃ | 0.01 |
| 5 | CBr₃COOH | 0.0117 |
| 6 |  | 0.0059 |
| 7¹ |  | 0.0104 |

¹ Concentration of promoter = 0.047 M.

*Example 7*

A Sutherland reactor was charged with 2 liters of a paraffin cut boiling at 180–200° C., heated to 120° C., and saturated with ethylene to a pressure of 30 p.s.i.g. One mMole of aluminum sesquichloride was added along with 0.3 ml. of 0.02 M tertiary-butyl orthovanadate. Then 0.16 ml. of ethyl trichloroacetate was added. A rapid polymerization began but stopped after several minutes; the pressure was kept constant by the addition of ethylene. A solution of 0.1 M ethyl trichloroacetate was added at the rate of 3.7 ml./min. The addition of a solution of 0.4 M aluminum sesquichloride was begun and the rate varied as required to maintain a polymerization rate of liter of gas per minute (as measured at 25° C. and atmospheric pressure). By this method, it was possible to polymerize 110 liters of gas before the solution became too viscous to stir efficiently. This solution was vented under pressure into a 3-necked flask, fitted with stirrer and reflux condenser, and containing 2 liters of heptane and 60 ml. of butanol. This slurry was stirred for an hour at 70° C., filtered and rewashed with 4% NaOH for an hour at 60° C. This base also contained 0.6 ml. of 50% gluconic acid. The solid polyethylene was filtered, washed with water until neutral, and dried in a vacuum oven overnight. It weighed 102 g.

When the run was repeated without the addition of ethyl trichloroacetate, it was not possible to maintain the same polymerization rate, and only 5 g. of polyethylene was produced before expiration of catalyst activity.

What I claim and desire to protect by Letters Patent is:

1. In the process for polymerizing ethylene in an inert organic diluent in the presence of a catalyst obtained by reaction of a tri- to pentavalent vanadium compound soluble in the diluent with an organoaluminum compound, the improvement which comprises forming the catalyst in the presence of a halogenated compound selected from the group consisting of alkyl esters of trichloro- and tribromoacetic acids, hexachloroacetone, hexachloropropylene, and benzotrichloride and employing an amount of vanadium compound within the range of 0.001 to 1 millimole per liter of diluent, a molar ratio of halogenated compound to vanadium compound of from 10:1 to 100:1, and a molar ratio of aluminum compound to vanadium compound of at least 3:1, whereby the activity of the catalyst is increased so that a higher yield of polymer per unit of vanadium compound is obtained.

2. In the process for polymerizing ethylene in an inert organic diluent in the presence of a catalyst obtained by reaction of a tri- to pentavalent vanadium compound soluble in the diluent with an organoaluminum compound, the improvement which comprises forming the catalyst in the presence of hexachloroacetone and employing an amount of vanadium compound within the range of 0.001 to 1 millimole per liter of diluent, a molar ratio of hexachloroacetone to vanadium compound within the range of 10:1 to 100:1, and a molar ratio of aluminum compound to vanadium compound of at least 3:1, whereby the activity of the catalyst is increased so that a higher yield of polymer per unit of vanadium compound is obtained.

3. The process of claim 1 in which ethylene is copolymerized with propylene and a diolefin.

4. The process of claim 1 in which ethylene is copolymerized with at least one other ethylenically unsaturated hydrocarbon.

5. The process of claim 1 in which the halogenated aliphatic compound is ethyl trichloroacetate.

6. The process of claim 1 in which the halogenated aliphatic compound is t-butyl trichloroacetate.

7. The process of claim 1 in which the halogenated aliphatic compound is hexachloropropylene.

8. The process of claim 1 in which the halogenated aliphatic compound is benzotrichloride.

9. The process of claim 1 in which the halogenated aliphatic compound is methyl tribromoacetate.

References Cited by the Examiner

UNITED STATES PATENTS

| 2,944,048 | 7/1960 | Nowlin | 260—94.9 |
| 3,051,690 | 8/1962 | Vandenberg | 260—88.2 |

FOREIGN PATENTS

| 37-1592 | 5/1962 | Japan. |
| 1,302,656 | 7/1961 | France. |

JOSEPH L. SCHOFER, *Primary Examiner.*

M. B. KURTZMAN, *Assistant Examiner.*